Feb. 17, 1970  J. F. ADAMIK  3,495,382
PLASTISOL RECOVERY SYSTEM
Filed May 16, 1967  5 Sheets-Sheet 1
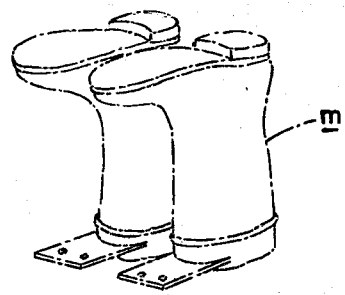
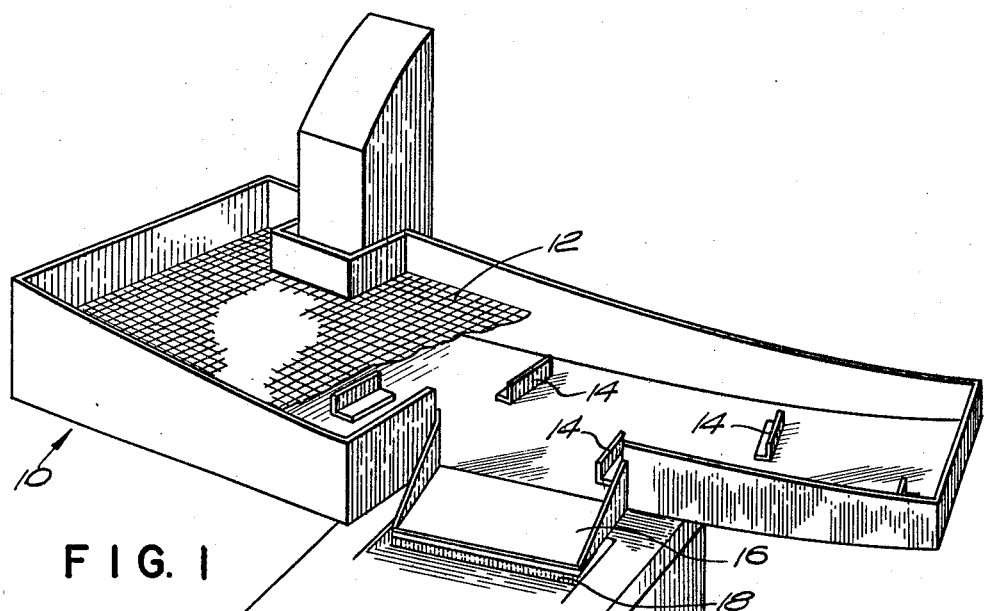
FIG. 1
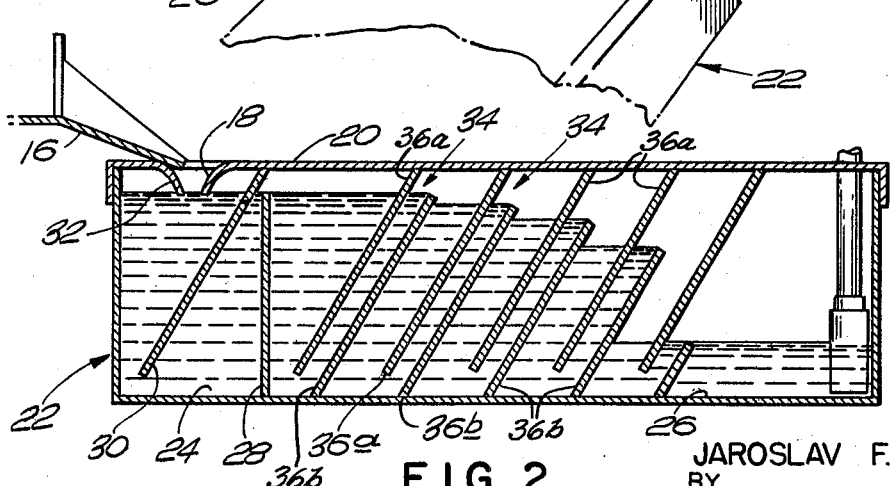
FIG. 2
INVENTOR.
JAROSLAV F. ADAMIK
BY
ATTORNEYS

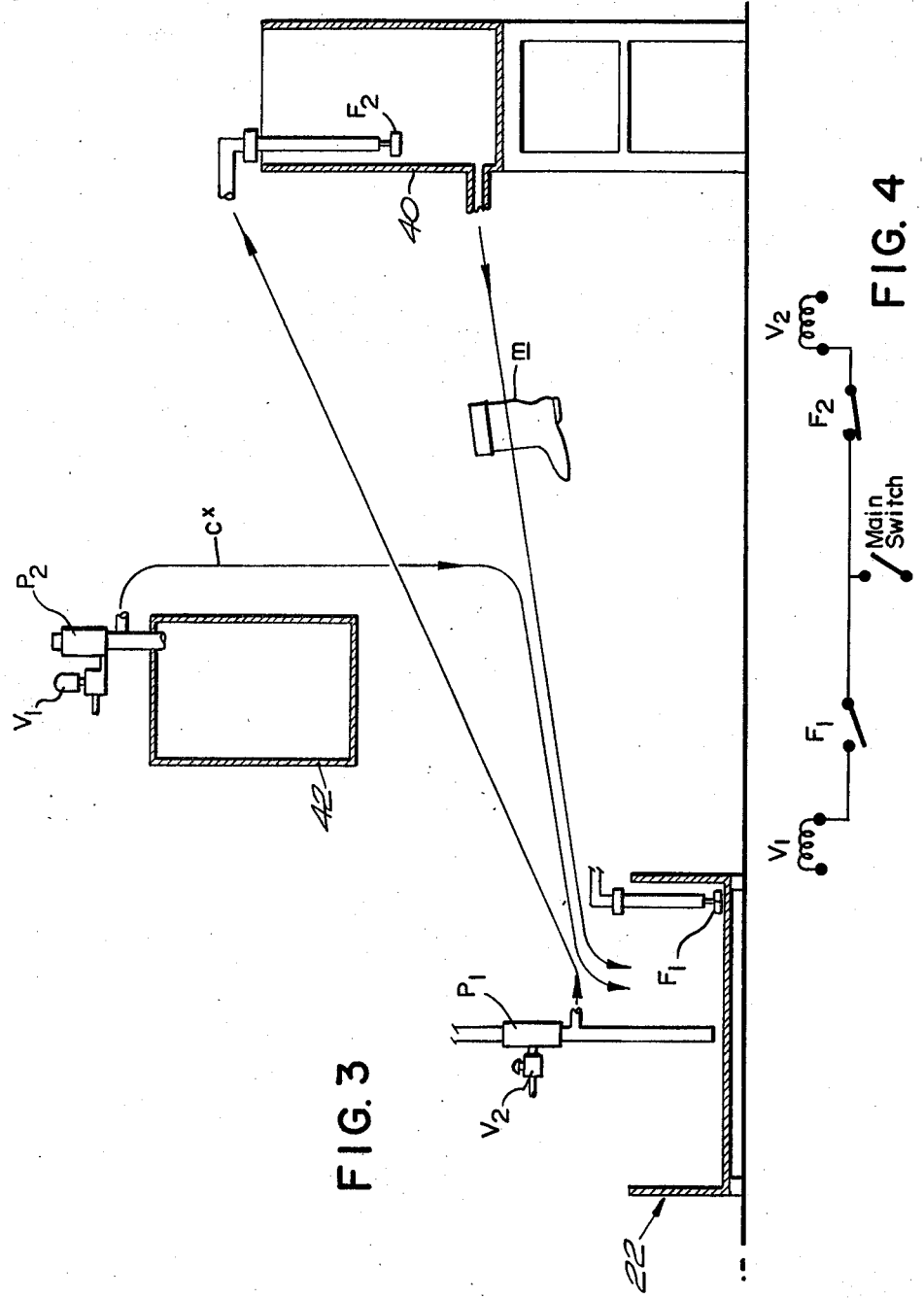

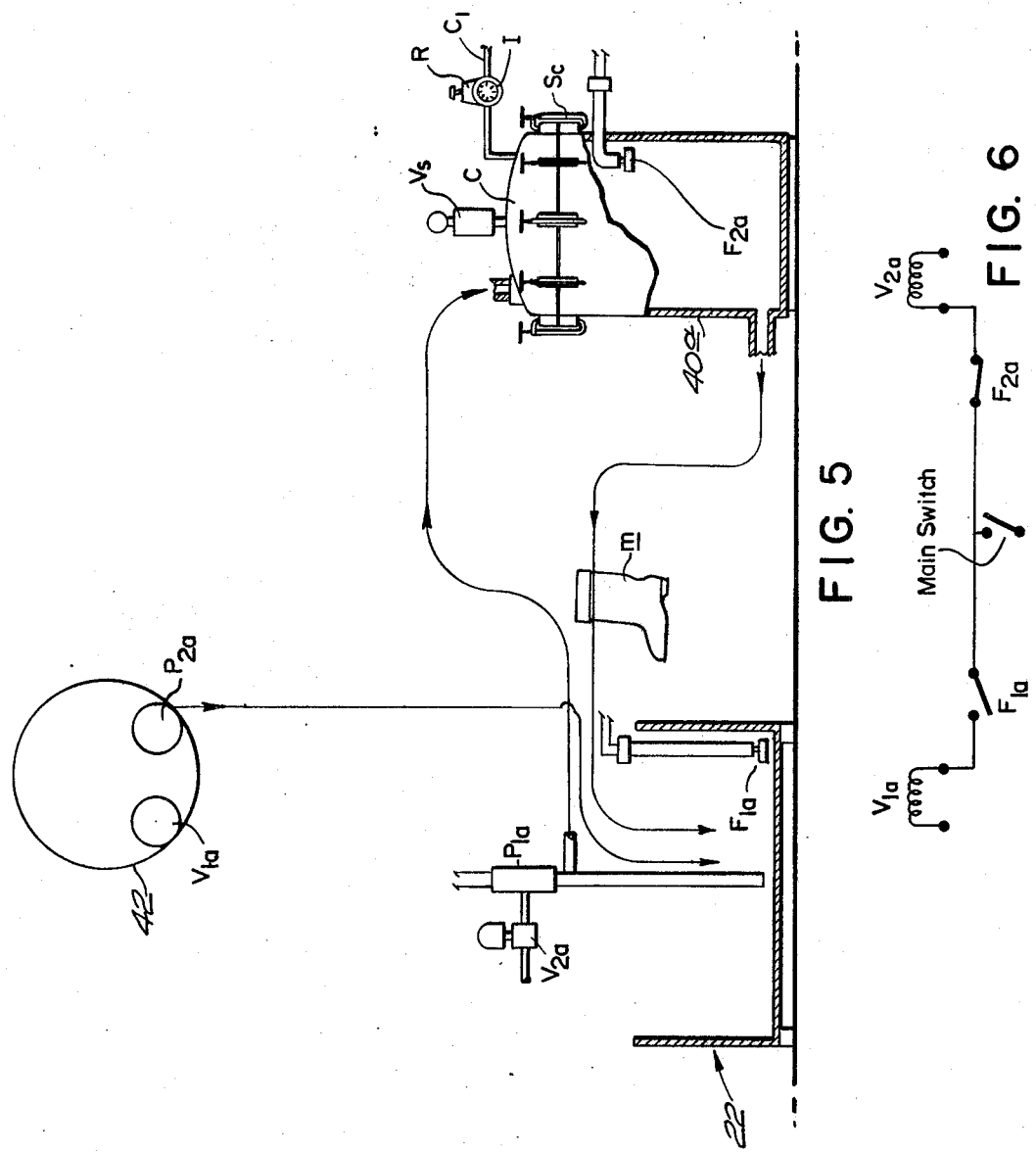

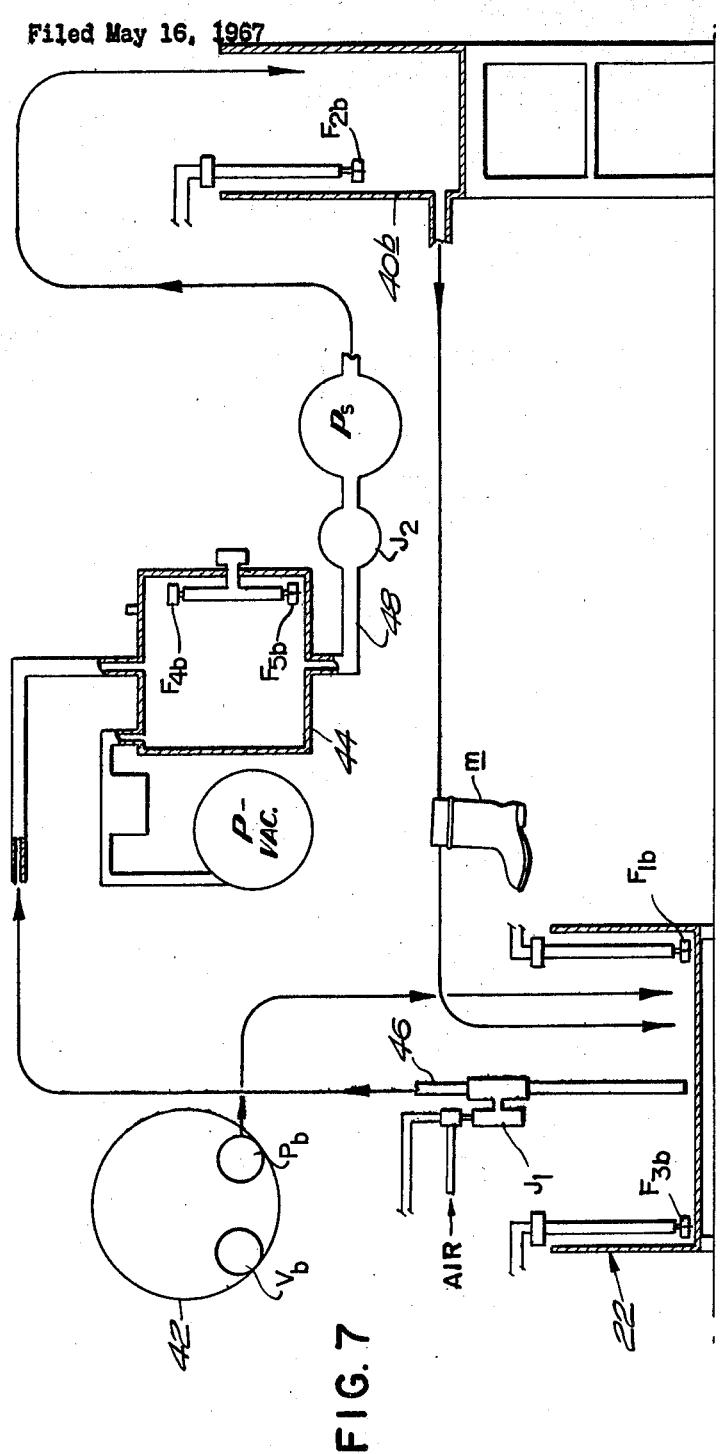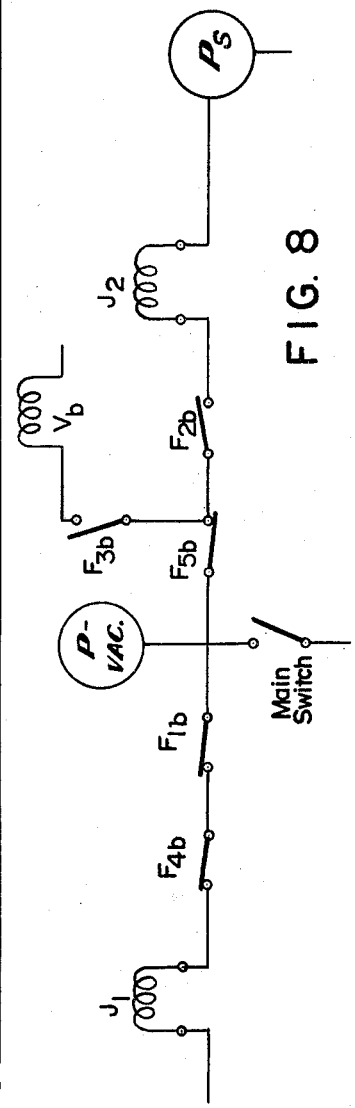
FIG. 7
FIG. 8
INVENTOR
JAROSLAV F. ADAMIK
BY
ATTORNEYS

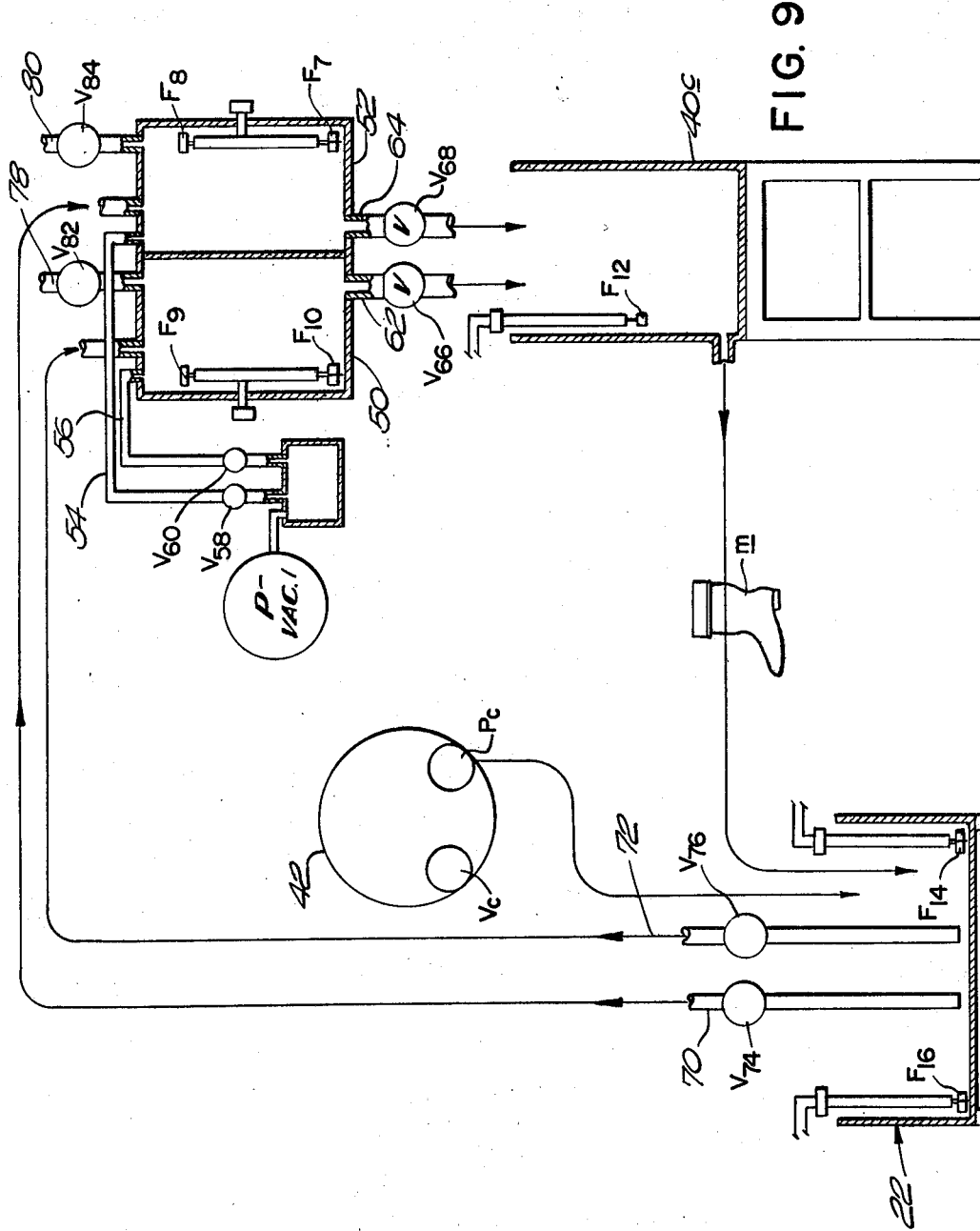

3,495,382
PLASTISOL RECOVERY SYSTEM
Jaroslav F. Adamik, Warren, R.I., assignor, by mesne assignments, to Marbill Company, Providence, R.I., a corporation of Rhode Island
Filed May 16, 1967, Ser. No. 638,922
Int. Cl. B01d 19/00
U.S. Cl. 55—166                        4 Claims

ABSTRACT OF THE DISCLOSURE

A plastisol recovery system for slush-molding machines embodying a tray for receiving the used plastisol as it is dumped from the molds, a recovery tank into which the plastisol flows from the tray and is routed through baffles to remove air, a vacuum tank for further deaeration a supply tank for adding fresh plastisol to the used plastisol as fast as the latter is depleted and float-actuated pumps and valves for returning the deaerated plastisol to the main supply tank which may be operated at atmospheric or superatmospheric pressure.

BACKGROUND OF THE INVENTION

In my pending application Ser. No. 625,678, filed Mar. 24, 1967, there is disclosed a slush-molding machine wherein a plurality of molds are moved successively from one station to another for filling the molds with a plastic material, gelling plastisol on the interior of the molds, dumping the excess plastisol and curing the residual plastisol to form articles defined by the molds. As therein illustrated, the molds were for making boots and at one point in the operation of the machine where the excess plastisol was dumped, the molds were inverted to dump the plastisol onto a shallow tray. Plastisol dumped onto the tray was delivered to a recovery tank and one form of recovery system was illustrated in that application. This application is for the purpose of claiming the novel features of the recovery system disclosed in the aforesaid application and alternative systems designed for the same purpose, to wit, deaerating the used plastisol, adding fresh plastisol thereto when required and returning it to the main supply tank for reuse substantially automatically, that is, without constant attendance of an operator and with safeguards to prevent the level of the plastisol in the several tanks employed in the system from falling too low or rising too high.

SUMMARY

The apparatus comprises a recovery tank for receiving the used plastisol containing a partition dividing the tank into an antechamber and a main chamber, an inclined baffle in the antechamber having an upwardly facing sloping surface on which the plastisol is deposited and pairs of inclined baffles in the main chamber, the pairs of baffles being distributed at spaced intervals lengthwise of the tank with the lower edge of the first baffle of each pair of spaced baffles spaced from the bottom, with the lower edge of the second baffle abutting the bottom of the tank, and with the upper edge of the second baffle of each pair of baffles below the upper edge of the first baffle of each pair of baffles. There is means beyond the last pair of baffles for withdrawing the plastisol which has traversed the baffles from the tank. The second baffle plates of the pairs of baffle plates decrease in height in the direction of flow of the plastisol through the tank and the distance between pairs of baffle plates is greater than the distance between the plates of a pair of plates. An auxiliary supply tank is provided containing fresh plastisol, a conductor connects the auxiliary tank to the recovery tank, and a pump is operable to transfer fresh plastisol from the auxiliary tank to the recovery tank when required. Floats located in the recovery tank initiate operation of the pump when the level in the recovery tank falls too low and terminates operation when the level becomes too high. A float is also provided in the main supply tank and is operable when the level of the plastisol therein reaches a predetermined low level to start the pump in the recovery tank and when it reaches a predetermined high level to stop the pump in the recovery tank. The main supply tank may be at atmospheric pressure or at a pressure slightly above atmospheric pressure and when pressure is employed it is provided with a cover clamped thereto, a pressure connection for supplying air pressure at a few pounds above atmospheric pressure and a safety valve to relieve excessive pressure. A deaerating chamber may be employed between the recovery tank and the main supply tank and when used is maintained at a negative pressure by means of a vacuum pump. A conductor is provided for conducting plastisol from the recovery tank to the deaerating tank and embodies a valve which may be opened and closed alternately to permit plastisol to be drawn from the recovery tank into the vacuum chamber and to prevent such flow. The plastisol is delivered from the vacuum chamber to the main supply tank by a screw pump and there are floats controlled for starting and stopping the pump as the plastisol falls and rises in the main supply tank. Two such deaerating tanks may be employed in combination so that one may be maintained under a negative pressure while plastisol is being drawn into it and the other at atmospheric pressure while plastisol is being discharged from it.

The invention will now be described in greater detail with reference to the accompanying drawings wherein:

FIG. 1 is an isometric showing a tray into which used plastisol is dumped from molds located above it and is transferred therefrom into a recovery tank;

FIG. 2 is a vertical, longitudinal section through the recovery tank;

FIG. 3 diagrammatically illustrates one form of recovery system used in conjunction with the recovery tank to return the used plastisol to the main supply tank;

FIG. 4 is a wiring diagram for control of the pumps employed in the system shown in FIG. 3;

FIG. 5 diagrammatically illustrates a recovery system in which the main supply tank is under pressure;

FIG. 6 is a wiring diagram for the controls employed in FIG. 5;

FIG. 7 diagrammatically illustrates a recovery system in which a deaerating tank is employed;

FIG. 8 is a wiring diagram for the control of the system shown in FIG. 7; and

FIG. 9 diagrammatically illustrates a recovery system in which dual deaerating tanks are employed.

The apparatus shown in the drawings and which forms the subject matter of this invention is employed in conjunction with the slush-molding machine shown in my pending application at the stage of operation of that machine where the hollow molds, which have previously been filled with plastistol and have been subjected to heating to effect gelling of a layer on the inner sides of the molds, are inverted to dump out the excess plastistol. The purpose of the apparatus is to return the used plastisol cleaned of any foreign material and free of air bubbles to the main supply tank mixed with fresh plastisol when required to make up for that used up.

The plastisol as shown in FIG. 1 is dumped from the molds m into a shallow tray 10 onto a screen 12 supported in spaced relation to the bottom, the purpose of which is to remove any foreign material or solid particles which may have been accidentally dropped into the molds between the time of filling and the time of dumping. As illustrated, the tray has a lateral extension, the purpose of which as described in the aforesaid application is to catch the drip from the molds which remain inverted as they travel toward the next operation and in this extension there are a plurality of baffle plates 14 at the bottom, the purpose of which is to retard the flow of the plastisol, minimize turbulence and remove as much of the air which becomes trapped therein as possible. Plastisol is discharged from the tray by means of an inclined trough 16 in the lateral extension through a narrow opening 18 in the top 20 of a recovery tank 22.

The recovery tank is designed especially to eliminate as much of the entrained air from the liquid plastisol as possible and to this end is divided into two chambers, an antechamber 24 and a main chamber 26, by a vertically disposed partition 28 adjacent the end in which the opening is located. Within the antechamber there is an inclined baffle plate 30, the upper inclined surface of which is directly below the opening 18 so that liquid plastisol flowing through the opening falls onto the surface and is conducted to the bottom of the chamber with a minimum amount of agitation. Continuous and smooth flow of plastisol from the trough into the antechamber 24 is provided for by downwardly converging lips 32 along the opposite parallel edges of the opening 18 which direct the stream of plastisol onto the upper surface of the baffle plate 30 substantially midway between the opposite walls of the chamber.

The partition 28 is not as high as the tank is deep so that the liquid plastisol flows over its upper edge into the main chamber 26. In this chamber there are a plurality of pairs 34 of inclined spaced parallel baffle plates 36a, 36b, each pair comprising a first baffle plate 36a, the upper edge of which abuts the top of the tank and the lower of which is spaced from the bottom of the tank, and a second baffle plate 36b, the upper edge of which is spaced from the top of the tank and the lower edge of which abuts the bottom of the tank. These baffles extend from side wall to side wall so that the plastisol which arrives in the main chamber 26 is caused to flow in a circuitous path upwardly between the first set of baffle plates, downwardly between the second baffle plate of the first set and the first baffle plate of the second set and so on until it has traversed all of the baffles. The second baffle plates of each pair of baffle plates become progressively shorter in the direction of flow. The arrangement of the baffle plates is such as to cause the plastisol to move upwardly over the inclined surfaces of the plates at a faster rate than it flows downwardly between the sets of baffle plates thus promoting and permitting air bubbles to escape from the plastisol.

As related in the aforesaid application, the plastisol may be delivered to the molds by gravity or by pressure and accordingly both gravity and pressure systems are illustrated herein together with approximate means for making the transfer of the plastisol from the recovery tank to the main supply tank, deaerated and mixed with fresh plastisol when depleted to the extent that fresh plastisol must be added.

FIG. 3 diagrammatically shows a gravity system in which the plastisol flow line is from the bottom of an elevated main supply tank 40 into the molds $m$, from the molds to the recovery tank 22 and from the recovery tank 22 back to the main supply tank 40. A pump P1 transfers the plastisol from the recovery tank 22 to the top of the main supply tank 40 and its operation is controlled by a float F2 mounted in the main supply tank 40. When the float F2 indicates a need for more plastisol as, for example, when the level of the plastisol falls to a predetermined low level, it actuates a switch which in turn energizes a solenoid-operable valve V2. The valve V2 when opened admits air pressure at about 80 pounds per square inch to the pump P1, the intake end of which is located in the recovery tank. Pump P1 transfers the plastisol from the recovery tank to the main supply tank 40 until the float F2 rises to a predetermined maximum level whereupon it deactivates the switch, de-energizes the solenoid and stops the pump P1. During operation should the plastisol in the recovery tank 22 fall below a predetermined low level, a float F1 in the recovery tank will activate a switch which in turn energizes a solenoid-operable valve V1. The valve V1 when opened supplies pressure to a pump P2 mounted in an auxiliary tank 42 containing a fresh supply of plastisol whereby the plastisol therein is delivered to the recovery tank 22. The pump P2 will be shut off as soon as the level in the recovery tank 22 reaches a predetermined high level.

A simple wiring diagram for the foregoing system is shown in FIG. 4 with the solenoid-operable valves and float-actuated switches labeled.

A pressure system is diagrammatically illustrated in FIG. 5 in which the plastisol flow line is from the bottom of a main supply tank 40a, into the molds $m$, from the molds $m$ into the recovery tank 22 and from the recovery tank 22 back to the top of the main supply tank 40a. A pump P1a transfers the plastisol from the recovery tank 22 to the top of the main supply tank 40a, the latter being provided with a cover C and screw clamps Sc for maintaining a pressure within the tank. A pipe C1 supplies pressure to the tank and contains an air pressure regulator R including an indicator I by means of which the pressure admitted to the tank may be regulated. A pressure of 2 to 4 pounds per square inch is sufficient. A safety valve Vs is mounted in the cover C to release the pressure when it becomes excessive. Pump P1a is controlled by a float F2a mounted in the tank 40a. The float F2a operates when the level becomes too low to actuate a switch which in turn actuates a solenoid controlled valve V2a. Air pressure supplied to the valve V2a operates the pump P1a which will pump plastisol to the tank 40a until the float F2a de-activates the switch, de-energizes solenoid valve V2a and hence stops the pump P1a. During operation should the level of the plastisol in the recovery tank fall too low, the float F1a will actuate its switch and hence the solenoid-operable valve V1a and thus admit air pressure to a pump P2a located in the tank 42. The pump P2a will pump plastisol to the recovery tank 22 until the float F1a de-energizes its switch, de-energizes the solenoid-operated valve V1a and hence stops the pump P2a.

A simple wiring diagram for the foregoing system is shown in FIG. 6 with the solenoid-operable valves and float-actuated switches labeled.

A second gravitational system is illustrated diagrammatically in FIG. 7 in which the plastisol flow line is from the bottom of an elevated main supply tank 40b into the molds $m$, from the molds $m$ into the recovery tank 22, from the recovery tank 22 to a deaerating tank 44 and from the deaerating tank 44 back to the main supply tank 40b. A vacuum pump P–VAC, the intake side of which is connected to the tank 44, maintains the latter at a suitable pressure. The plastisol is transferred from the recovery tank 22 to the vacuum tank 44 by a conductor 46, one end of which is submerged in the recovery tank 22 and the other end of which is connected to the top of the deaerating tank 44. A Jamesbury valve J1 is embodied in the conductor 46 and is opened and closed by the floats F1b and F4b. If there is sufficient plastisol in the recovery tank 22 and there is need for plastisol in the deaerating tank 44, the float F4b will actuate its switch, which actuates the solenoid of the Jamesbury valve J1, opening the latter so that plastisol is drawn upwardly through the conductor 46 into the deaerating tank 44 by the vacuum therein. When the level in the deaerating tank 44 reaches a predetermined height, the float F4b will deactivate the switch and solenoid to close the Jamesbury valve J1. The float F1b also operates to close the Jamesbury valve J1 if the level in the recovery tank 22 falls too low to prevent air entering the conductor 46. A second float F3b in the recovery tank 22 operates when the level is too low to actuate a switch and hence the solenoid-controlled valve Vb of the pump Pb. The pump Pb will then transfer plastisol from the auxiliary tank 42 to the recovery tank 22 until the level rises in the recovery tank 22 to a predetermined level whereupon the float F3b will stop the pump Pb. The deaerating tank 44 is connected to the main supply tank 40b by a conductor 48 in which there is interposed a Jamesbury valve J2 and a screw pump Ps. In the main supply tank 40b there is a float F2b and when the level in the main supply tank 40b falls too low it opens the Jamesbury valve J2 and starts the screw pump Ps. The screw pump Ps will continue to operate until the level in the main supply tank 40b reaches a predetermined height and will then be stopped. The pump Ps will also be stopped by the float F5b should the level in the deaerating tank 44 fall too low.

A simple wiring diagram of the foregoing system is shown in FIG. 8 with the solenoid-operated valves and float-actuated switches labeled.

A third gravity system is shown in FIG. 9 wherein the plastisol flow line is from the bottom of an elevated main supply tank 40c into the molds m, from the molds m into the recovery tank 22, from the recovery tank through dual tanks 50, 52 and from thence to the main supply tank. Conductors 70, 72 submerged at one end in the recovery tank 22 and connected at their other ends to the tanks 52 and 50 provide for transfer of the plastisol from the recovery tank 22 to one or the other of the two tanks 52, 50. Valves V74 and V76 in these conductors control the flow therethrough. Vents 78 and 80 in the tanks 50 and 52 controlled by valves V82 and V84 provide for connecting the tanks 50 and 52 to the atmosphere. The tanks 52 and 50 are connected by conductors 54 and 56 containing valves V58 and V60 to a vacuum pump P-VAC1. As thus arranged, the tank 50 can be connected to the vacuum pump P-VAC1 by opening a valve V60 to establish a vacuum therein which will draw plastisol from the recovery tank 22 through the conductor 72 provided the valve V76 is open and provided the valve V82 is closed. During this period the valve V58 connecting the conductor 54 to the tank 52 is closed. The valve V74 in the conductor 70 is closed. The valve V84 in the vent 80 is open and the valve V68 in the conductor 64 is open so that the chamber 52 is at atmospheric pressure and the deaerated plastisol therein flows gravitationally therefrom through a conductor 64 into the main supply tank 40c. When the level of the plastisol in the tank 52 reaches a predetermined low point, a float F7 therein will close the valves V68 and V84 and open the valves V58 and V74. The float F8 in the tank 52 will close the valve V74 when the plastisol reaches a predetermined high level therein. While the plastisol is gravitating from the tank 52, the tank 50 is being filled and when it is filled the float F9 therein will close the valve V60 and the valve V76. The float F10 will close the valve V66 when the level therein becomes too low. A float F12 provides for opening the valves V66, V68, V82 and V84 according to which of the tanks 50, 52 supplies plastisol to the main supply tank 40a and a float F14 in the recovery tank 22 is operative to close both valves V74, V76 when the level becomes too low therein. A float F16 operates when the level becomes too low to activate the solenoid valve Vc of the pump Pc in the auxiliary tank 42 to start it when the plastisol is needed and to stop it when enough plastisol has been delivered to the recovery tank.

Each of the systems illustrated herein is designed to return the used plastisol to the main supply tank with as little air in it as possible and when necessary to replenish the supply in the main tank by adding fresh plastisol to the used plastisol and to effect such recovery, deaeration and recirculation in varying degrees of automation.

It should be understood that the present disclosure is for the purpose of illustration only and that this invention includes all modifications and equivalents falling within the scope of the appended claims.

I claim:

1. Apparatus for recovery of plastisol used in a slush-molding process and returning it to the main supply tank for reuse, comprising a main supply tank, a recovery tank for receiving the used plastisol, longitudinally spaced flat plates in the recovery tank for entraining air bubbles contained by the used plastisol and liberating them at the top of the tank, said flat plates dividing the space above the plastisol between pairs of baffles into separate compartments for receiving the liberated bubbles, and means for adding fresh plastisol to the recovery tank to the deaerated plastisol therein comprising an auxiliary supply tank supported above the recovery tank, said auxiliary supply tank containing fresh plastisol, means including a pump at the top of the auxiliary supply tank and a conductor extending therefrom to the top of the recovery tank operable to effect flow of plastisol from the auxiliary tank to the recovery tank, and a float in the recovery tank operable when the plastisol in the recovery tank reaches a predetermined low level to start the pump and when it reaches a predetermined high level to stop the pump.

2. Apparatus according to claim 1, wherein the pump is actuated by air pressure supplied thereto through a solenoid-operable valve, and the float closes and opens a switch which in turn activates or deactivates the solenoid.

3. Apparatus according to claim 1, comprising a deaerating tank interposed between the recovery tank and the main supply tank, a vacuum pump connected to the deaerating tank, said vacuum pump being operable to maintain the deaerating tank at a negative pressure such as to induce egress of air from the plastisol therein, a conductor supported with one end in the recovery tank and the other end connected to the deaerating tank, a valve in the conductor, and a float in the deaerating tank for controlling the valve to close the valve when the plastisol therein reaches a predetermined high level and to open the valve when the plastisol therein reaches a predetermined low level.

4. Apparatus for recovery of plastisol used in a slush-molding process and returning it to the main supply tank for reuse, comprising a main supply tank provided with a cover, a recovery tank, an auxiliary supply tank, a float in the main supply tank operable when the plastisol in the main supply tank reaches a predetermined low level to initiate transfer of plastisol from the recovery tank to the main supply tank, and when it reaches a predetermined high level to terminate transfer, a float in the recovery tank, means operable by the float in the recovery tank, when the plastisol therein reaches a predetermined low level, to initiate transfer of the plastisol from the auxiliary tank to the recovery tank, and when it reaches a predetermined high level to terminate transfer, and means including a conductor pipe connected at one end to the cover for supplying air at a pressure of 2 to 4 p.s.i. to the interior of the main supply tank above the plastisol therein, and an adjustable safety valve mounted on the cover operable to relieve the pressure when it exceeds a predetermined amount.

References Cited

UNITED STATES PATENTS

| 1,529,884 | 3/1925 | Hall | 55—190 |
| 2,357,445 | 9/1944 | Baker | 55—160 X |
| 2,955,539 | 10/1960 | Gardner | 103—50 X |
| 2,966,230 | 12/1960 | Cervinka | 55—193 |

REUBEN FRIEDMAN, Primary Examiner

R. W. BURKS, Assistant Examiner